Patented Dec. 14, 1948

2,456,316

UNITED STATES PATENT OFFICE 2,456,316

METHOD FOR PRODUCING α-ETHYL-PIPERONYL ETHERS

Edward A. Prill, Yonkers, N. Y., assignor to Boyce Thompson Institute for Plant Research, Inc., a corporation of New York No Drawing. Application June 10, 1947, Serial No. 753,799

5 Claims. (Cl. 260—338)

1

This invention has for its object the provision of an improved method for producing organic compounds represented by the formula:

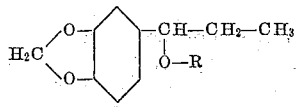

where R is an aliphatic hydrocarbon radical containing between 4 and 13 carbon atoms and which is interrupted by at least one ethereal oxygen atom. The methods for producing the compounds involve certain novel procedures and comprise the reaction of isosafrole with an equimolar quantity of a hydrogen halide, such as hydrogen chloride and hydrogen bromide, in an inert mutual solvent at a temperature preferably not exceeding 40° C. to produce isosafrole hydrohalide, and the subsequent reaction of equimolar quantities of the isosafrole hydrohalide with an organic hydroxy compound of the formula HOR, where R is the same as previously defined, in the presence of a hydrogen halide acceptor selected from the group consisting of alkali metal and alkaline earth metal carbonates and hydroxides activated with a small catalytic quantity of an organic nitrogen base.

Isosafrole on reaction with a hydrogen halide, such as hydrogen chloride and hydrogen bromide, according to Equation 1 which follows, where X denotes chlorine or bromine,

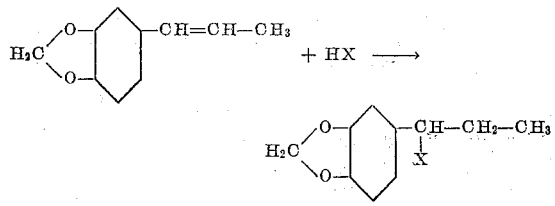

gives a product which is herein designated as isosafrole hydrohalide, or more specifically, as isosafrole hydrochloride or isosafrole hydrobromide. Methods of preparation for both of these isosafrole hydrohalides have been given in the literature and these compounds are stated to be too unstable at elevated temperatures to be purified by distillation. Because of the possibilities of side reactions in this step, such as the formation of polymerization or condensation products arising from two or more molecules of isosafrole and rupture of the methylene-dioxy group, the reaction requires certain precautions, particularly avoidance of a high temperature. The formation of isosafrole hydrochloride as the

2 intermediate for the production of the insecticidal compound is preferred because of the greater availability of hydrogen chloride gas as compared to that of hydrogen bromide gas.

I have found that on saturating ice-cold isosafrole alone with hydrogen chloride gas at atmospheric pressure, only about half as much hydrogen chloride was dissolved as would be required for the quantitative formation of isosafrole hydrochloride. From experience gained in working with these substances, it is my belief that for substantial conversion into isosafrole hydrohalide, the isosafrole should be held in contact with a high concentration of the hydrogen halide and a quantity thereof greatly in excess of an equimolar quantity. The use of a suitable mutual solvent is advantageous for this purpose and it provides a further advantage in that the dilution of the isosafrole in the presence of a hydrogen halide decreases the tendency to the formation of polymerization or condensation products from two or more molecules of isosafrole. Glacial acetic acid is a suitable mutual solvent for isosafrole and hydrogen bromide and it has been so used in the prior art, but it does not have sufficient solvent action on hydrogen chloride.

A particular aspect of my invention is the use of organic compounds containing ethereal oxygen in their structures as inert mutual solvents for isosafrole and a hydrogen halide. Some examples of such solvents are ethyl ether, 1,4-dioxane, and the previously defined compound of the formula HOR, hereinafter to be designated for convenience as the "alcohol-ether," which subsequently is to be reacted with the isosafrole hydrohalide to produce the specific insecticidal compound. The use of the said alcohol-ester is particularly advantageous here because it dispenses with the need for a solvent which is not a reactant in the subsequent process step. Furthermore, in recycling the foreruns consisting of isosafrole and the alcohol-ether from the distillation of the crude product of the subsequent process step, no separation of the isosafrole and the alcohol-ether is needed. Additional mutual solvents of the type are isopropyl ether, dimethyl and diethyl ethers of ethylene glycol, of diethylene glycol, and of polyethyelene glycols, and the like; also mixtures comprising any of these and the previously mentioned mutual solvents. Preferably, for the purpose of the isolation of the final insecticidal compound in pure form, the mutual solvent should be of such a nature that it is readily removable after either the first or the subsequent process step by procedures such as distillation or washing out with water. This constitutes an improved method of making an isosafrole hydrohalide, particularly isosafrole hydrochloride, and in the special case wherein the mutual solvent is the appropriate alcohol-ether, it also constitutes a very useful aspect pertaining to the entire process of making the insecticidal compound.

The word "inert" in the term "inert mutual solvent," as used above, is intended to mean that the mutual solvent undergoes no undesirable reaction to any significant extent in this first process step. Also any reversible formation of any unstable addition compound between the mutual solvent and another component should not be construed as contrary to the term "inert mutual solvent."

The subsequent reaction of the isosafrole hydrohalide and an alcohol-ether takes place in the presence of a hydrogen halide acceptor and is represented by equation 2 which follows:

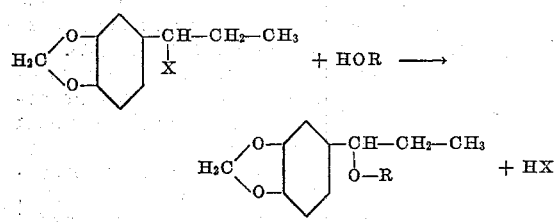

The resulting product is a mixed ether; α-ethylpiperonyl being one radical and R being the other radical thereof. In the general practice of organic chemistry, mixed ethers are commonly prepared by treating an appropriate reactive organic halide with a reactant such as the appropriate sodium alcoholate under anhydrous conditions; the conditions necessarily being anhydrous because the sodium derivative of an alcohol is unstable toward water. The application of the discovery that moisture need not be excluded and that many readily available inorganic substances of alkaline reaction which are not unstable in the presence of water, even such substances which produce water in the act of accepting and reacting with a hydrogen halide, may be used effectively as hydrogen halide acceptors, constitutes a particularly useful aspect of the invention and which contributes further toward making the production of the compounds simple, economical, and efficiently executable without elaborate processing and equipment.

On the other hand, certain inorganic substances of alkaline reaction by themselves, as, for example, a form of sodium carbonate, were not found satisfactory; however, by adding a small amount of an organic nitrogen base, the desired reaction product was obtained. Presumably, the small amount of organic nitrogen base acts as an "intermediary hydrogen halide acceptor" in transferring the hydrogen halide to the less soluble inorganic hydrogen halide acceptor; it properly can be considered as a catalyst. Triethylamine was used as the catalyst in some of the examples, other basic amines, including primary, secondary, and tertiary, and also cyclic nitrogen bases may be similarly used. An organic nitrogen base having a suitable boiling point is desirable because it may be recovered along with any unreacted isosafrole and alcohol-ether, and it may advantageously be carried along through the recycling process.

Suitable hydrogen halide acceptors which function with the aid of a small catalytic quantity of an organic nitrogen base are the hydroxides of the alkali and alkaline earth metals, and the salts of these with carbonic acid; others are the di- and tri-alkali metal ortho phosphates. Sodium bicarbonate in the form of the ordinary commercial powder was found to be very convenient and effective hydrogen halide acceptors even without the aid of a catalyst. Sodium sesquicarbonate and potassium bicarbonate were also found to be effective without the aid of a catalyst.

In the examples illustrating the methods of production, the yields of the desired product isolated in certain cases do not closely approach the theoretical yield. This possibly may be due to either incomplete reaction of the isosafrole with the hydrogen halide according to the reaction represented by equation 1, or abstraction of hydrogen halide from the isosafrole hydrohalide by the hydrogen halide acceptor in the manner which would constitute the reversal of the reaction represented by equation 1, or both causes. Incomplete conversion of the isosafrole to the desired product does not constitute a serious deficiency of the methods because the greater part of those portions of the isosafrole and the alcohol-ether which are not converted to the desired product can be easily recovered and recycled.

The following specific examples illustrate the various mehods that were used for the preparation of the preferred compound, α-ethylpiperonyl 2-(2-n-butoxyethoxy)ethyl ether the compound of the previously given general formula wherein R is

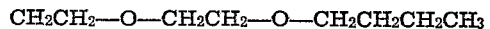

CH₂CH₂—O—CH₂CH₂—O—CH₂CH₂CH₂CH₃

The alcohol-ether (HOR) used for the preparation of this compound was diethylene glycol mono-n-butyl ether, hereinafter to be referred to by its trade name, butyl "Carbitol." This insecticidal compound when purified by redistillation boiled at 170 to 174° C. at about 1 mm. of mercury pressure. For the determination of the yields in the following examples, the product distilling over the range of 170 to 185° C. at about 1 mm. was collected in each case. Practically all of the foreruns consisting of recovered isosafrole and butyl "Carbitol" in each case distilled below 130° C. at this pressure. The residues remaining in the distilling flask after distillation of the desired product were quite small. In conducting these syntheses, the mixtures containing isosafrole and a hydrogen halide after preparation were held in stoppered flasks during the continuation of the reaction corresponding to the first process step. In the subsequent process step the flasks were open to the air unless otherwise indicated. In most of the illustrations I have used 0.2 mole (32.4 g.) of isosafrole to 0.3 mole (49 g.) of the alcohol-ether. Other ratios of these substances may be used, possibly with some advantages, but it would be obviously advantageous that the molar quantity of the alcohol-ether should be at least as great as that of the isosafrole.

*Example I*

Sixteen grams of hydrogen chloride gas were absorbed into an ice-cold mixture of 32.4 g. of isosafrole and 32 ml. of 1,4-dioxane. After being held at about 0° C. until the next day, pentane was added and the remaining free hydrogen chloride and the dioxane were washed out by shaking with cold water. The pentane solution containing isosafrole hydrochloride was dried over anhydrous sodium sulfate, filtered, and freed from most of the pentane by evaporation under reduced pressure.

Sodium ethoxide was prepared in a distilling flask by reaction of 4.6 g. of metallic sodium and absolute ethanol followed by removal of most of the excess ethanol by distillation under reduced pressure. There was then added 100 ml. of dry butyl "Carbitol" and the mixture heated under reduced pressure until all the ethanol had been distilled out and butyl "Carbitol" began to distill. This solution containing the sodium derivative of butyl "Carbitol" was cooled and mixed with the preparation containing the isosafrole hydrochloride in a flask protected from moisture. Reaction proceeded on gently warming on a steam bath and was evidenced by the formation of a precipitate of sodium chloride. After warming for several hours, the mixture was allowed to cool. It was then taken up in pentane and washed with water whereby the inorganic sodium derivatives and part of the excess butyl "Carbitol" were removed.

After removal of the pentane and fractional distillation of the crude product, 14 g. of the desired compound were obtained.

Example II

Eight grams of hydrogen chloride gas were absorbed into an ice-cold mixture of 32.4 g. of isosafrole and 49 g. of butyl "Carbitol" and the mixture then held for 16 hours at about 0° C. followed by 1 hour at room temperature. To this mixture were slowly added with stirring 32 g. of anhydrous sodium carbonate, then 15 ml. of water and 2 ml. of triethylamine. Then the reaction mixture was heated on a hot water bath for 4 hours while being stirred. The oily organic liquid was decanted off and the largely inorganic residue was taken up in water and extracted with pentane. The combined decanted organic liquid and the pentane extract were dried over anhydrous sodium sulfate and filtered. After evaporation of the pentane and fractional distillation of the crude product, 19 g. of the desired compound were obtained.

From a very similarly conducted experiment differing significantly from the above only in the omission of the addition of triethylamine, the results were unsuccessful. In the final fractional distillation in this case, considerable foreruns were distilled over their usual distilling range but then the distilling temperature climbed to above 200° C. at about 1 mm. and only a few drops of liquid distilled at the temperature range corresponding to that of the desired compound. Moreover, the distillation fractions were strongly acidic, doubtless due to the decomposition of remaining isosafrole hydrochloride at the high temperature required for distillation. In another experiment finely ground sodium carbonate monohydrate and no additional water was used without any organic nitrogen base. The results were again similarly unsatisfactory. (In all the other examples given herein the distillates were not acidic.) This illustrates the advantageous use of an organic nitrogen base as an "intermediary hydrogen chloride acceptor" or catalyst.

Example III

Ten grams of hydrogen chloride gas were absorbed into an ice-cold mixture of 32.4 g. of isosafrole and 49 g. of butyl "Carbitol." After being held at room temperature for 12 hours, the mixture was again cooled and 8 g. more of hydrogen chloride gas passed in; and then after being held 6 hours more at room temperature, 8 g. of hydrogen chloride were removed by applying suction. To the mixture were slowly added with stirring 15 g. of precipitated calcium carbonate and 0.5 ml. of triethylamine. The stirring was continued for 1 hour at room temperature and then for 5 hours while heating on a hot water bath. The mixture was then mixed with water and extracted with pentane. Much of the excess butyl "Carbitol" was not recovered in this run. The yield of the desired compound was 24 g.

Example IV

Thirteen grams of hydrogen chloride were absorbed into an ice-cold mixture of 32.4 g. of isosafrole and 49 g. of butyl "Carbitol." After being held at room temperature for 16 hours there were added to the mixture with stirring 25 ml. of a saturated aqueous solution of sodium hydroxide and 1 ml. of triethylamine. The stirring was continued for 2 hours at room temperature and then for 1 hour while heating on a hot water bath. From this point on, the working up of the product was the same as that from the corresponding stage of Example II. The yield of the desired compound was 15 g.

Example V

Sixteen grams of hydrogen chloride gas were absorbed into an ice-cold mixture of 32.4 g. of isosafrole and 49 g. of butyl "Carbitol." After being held at room temperature for 16 hours, 5 g. of hydrogen chloride were removed by suction. To the mixture was slowly added with stirring 33 g. of sodium bicarbonate. (When a salt of carbonic acid is used the addition must be slow and the mixture stirred because of the vigorous frothing due to the liberation of gases consisting of carbon dioxide and also in the initial stages, hydrogen chloride.) The stirred mixture was then heated on a hot water bath for 2 hours. In order to readily separate the product from the inorganic salts, 40 ml. of water were added and the mixture stirred for a short time. (Butyl "Carbitol," while very soluble in water, is not appreciably soluble in saturated salt solution, hence no significant amount of it should be lost in this procedure.) The oily organic layer was removed by decantation and combined with a pentane extract of the largely inorganic residue. The combined mixture, which was only slightly turbid, was dried over anhydrous sodium sulfate and filtered. After removal of the pentane by evaporation, the crude product was fractionally distilled. The yield of the desired compound was 36 g.

Example VI

Fourteen grams of hydrogen chloride gas were absorbed into an ice-cold mixture of 32.4 g. of isosafrole and 49 g. of butyl "Carbitol." After standing at room temperature for 24 hours, there was slowly added with stirring 30 g. of sodium bicarbonate. The mixture was stirred for about half an hour and then allowed to stand for about 16 hours. (The sodium bicarbonate remains fairly well suspended even without agitation.) At the end of this period there was still evolution of gas bubbles, which is evidence that the desired reaction was taking place even at room temperature. To insure completion of the reaction the mixture was heated for 2 hours on a hot water bath while being stirred. From this point on, the treatment was the same as that used at the corresponding stage of Example V. The yield of the desired compound was 35 g.

Example VII

About 30 g. of hydrogen chloride gas were absorbed into an ice-cold mixture of 32.4 g. of isosafrole and 100 ml. of ethyl ether. After being held at about 0° C. for 20 hours, excess free hydrogen chloride and ethyl ether were removed by evaporation under reduced pressure without warming above room temperature. After adding 49 g. of butyl "Carbitol," there was slowly added with stirring 20 g. of sodium bicarbonate. The mixture was stirred at room temperature for 3 hours, then allowed to stand for 24 hours (gas was still evolved), and then heated on a hot water bath for an hour while being stirred. From this point on, the treatment was the same as that used at the corresponding stage in Example V. The yield of the desired compound was 44 g.

Example VIII

Fifty-two grams of hydrogen bromide gas were absorbed into an ice-cold mixture of 32.4 g. of isosafrole and 50 ml. of glacial acetic acid and the mixture, which formed two layers, was held at about 0° C. for 24 hours. The mixture was then poured into ice water, the heavy oily layer containing the isosafrole hydrobromide was separated, and without drying, was mixed with 49 g. of butyl "Carbitol." To this was slowly added with stirring 35 g. of sodium bicarbonate. After standing until the next day the mixture was heated on a hot water bath with stirring. From this point on, the treatment was the same as that used at the corresponding stage in Example V. The yield of the desired compound was 44 g.

Example IX

Twenty-two grams of hydrogen bromide gas were absorbed into an ice-cold mixture of 32.4 g. of isosafrole and 49 g. of butyl "Carbitol" and the mixture then held at about 0° C. for 17 hours. To the ice-cold mixture was slowly added with stirring 25 g. of sodium bicarbonate. The stirring was continued for 3 hours while the mixture was at room temperature and then 1 hour while heated on a hot water bath. From this point on, the treatment was the same as that used at the corresponding stage of Example V. The yield of the desired compound was 35 g.

The following special test showed that butyl "Carbitol" was a sufficiently inert mutual solvent for isosafrole and hydrogen bromide in the first process step of the above. Fifteen grams of hydrogen bromide gas were absorbed into 25 g. of ice-cold butyl "Carbitol." After being held at about 0° C. for 17 hours, the mixture was poured into ice water, whereupon only about one gram of a water-insoluble bromide, presumably butyl "Carbityl" bromide, separated out. A seriously interfering reaction would have been evidenced by the formation of a much greater amount of such bromide.

Detailed examples of the methods have been illustrated by the above examples in which butyl "Carbitol" was the alcohol-ether. As examples of other compounds the following were prepared.

α-Ethylpiperonyl 2-n-butoxyethyl ether, the compound of the general formula wherein R is $-CH_2CH_2-O-CH_2CH_2CH_2CH_3$ was prepared similarly to the method of Example V but with the use of ethylene glycol mono-n-butyl ether (butyl "Cellosolve") as the alcohol-ether. This compound can also be prepared similarly to the methods of all the above examples. It distills at 135–140° C. at about 1 mm.

α-Ethylpiperonyl 2-(2-ethoxyethoxy)ethyl ether, the compound of the general formula wherein R is $$CH_2CH_2-O-CH_2CH_2-O-CH_2CH_3$$

was prepared similarly to the method of Example VII but with the use of diethylene glycol monoethyl ether (ordinary "Carbitol") as the alcohol-ether and the use of ethyl ether in place of pentane for the extraction of the final product. It can also be prepared similarly to the methods of all the above examples. It distills at 142–148° C. at about 1 mm.

α-Ethylpiperonyl tetrahydrofurfuryl ether, the compound of the general formula wherein R is

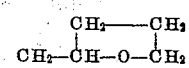

was prepared similarly to the method of Example VII but with the use of tetrahydrofurfuryl alcohol as the alcohol-ether. It can also be prepared similarly to the methods of some of the other above examples but tetrahydrofurfuryl alcohol cannot be used as an inert mutual solvent for isosafrole and a hydrogen halide. It distills at 145–150° C. at about 1 mm.

All of these illustrative compounds are almost colorless or faintly yellow, fairly limpid, oily liquids with only slight, not unpleasant odors.

The crude undistilled products containing the compounds may be used as insecticides, either as such or in the partially purified forms obtainable after removal of the water soluble or the more volatile excess starting materials by processes such as washing with water, distillation, or steam-distillation.

The purified compounds were tested as insecticides and were found to be very effective.

I claim:

1. The process of producing an organic compound represented by the formula:

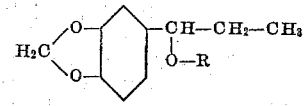

wherein R and in the compound HOR is an aliphatic hydrocarbon radical containing between 4 and 13 carbon atoms and which is interrupted by at least one ethereal oxygen atom; said process comprising the reaction of equimolar quantities of isosafrole and a hydrogen halide of the group consisting of hydrogen chloride and hydrogen bromide, in an inert ethereal mutual solvent selected from the group consisting of liquid saturated aliphatic ethers and polyethers, 1,4-dioxane, and a compound of the formula HOR at a temperature preferably not exceeding 40° C. to form isosafrole hydrohalide in solution; and the subsequent condensation of equimolar quantities of the said isosafrole hydrohalide and the compound of the formula HOR with the elimination of an equimolar quantity of hydrogen halide in the presence of a hydrogen halide acceptor selected from the group consisting of alkali and alkaline earth metal carbonates and hydroxides activated with a small catalytic quantity of an organic nitrogen base, R in both cases being an aliphatic hydrocarbon radical containing from 4 to 13 carbon atoms and which is interrupted by at least one etheral oxygen atom.

2. The process of claim 1 in which the hydrogen halide is hydrogen chloride and the isosafrole hydrohalide is isosafrole hydrochloride, and the hydrogen halide acceptor is sodium bicarbonate.

3. The process of producing an organic compound represented by the formula:

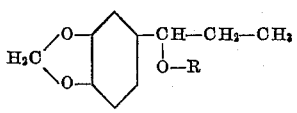

wherein R and in the compound HOR is an aliphatic hydrocarbon radical containing between 4 and 13 carbon atoms and which is interrupted by at least one ethereal oxygen atom, the method step comprising the condensation of equimolar quantities of an isosafrole hydrohalide of the group consisting of isosafrole hydrochloride and isosafrole hydrobromide and a compound of the formula HOR with the elimination of an equimolar quantity of hydrogen halide in the presence of a hydrogen halide acceptor selected from the group consisting of alkali and alkaline earth metal carbonate and hydroxides activated with a small catalytic quantity of an organic nitrogen base.

4. In the process of claim 3 using sodium bicarbonate as the hydrogen halide acceptor.

5. In the process of claim 3 producing the organic compound represented by the formula:

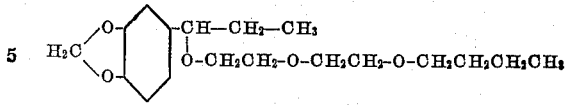

and using as the compound of the formula HOR the compound of the formula:

EDWARD A. PRILL.

REFERENCES CITED

The following references are of record in the file of this patent:

UNITED STATES PATENTS

| Number | Name | Date |
|---|---|---|
| 2,326,350 | Gertler et al. | Aug. 10, 1943 |
| 2,390,511 | Chester | Dec. 11, 1945 |
| 2,421,569 | LaForge et al. | June 3, 1947 |
| 2,421,570 | LaForge | June 3, 1947 |
| 2,431,844 | Synerholm | Dec. 2, 1947 |
| 2,433,491 | Synerholm | Dec. 20, 1947 |